(12) United States Patent
Tang (10) Patent No.: US 11,064,479 B2
(45) Date of Patent: Jul. 13, 2021

(54) CHANNEL RESOURCE INDICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/724,072

(22) Filed: Dec. 20, 2019

(65) Prior Publication Data

US 2020/0128521 A1 Apr. 23, 2020

Related U.S. Application Data

(63) Continuation of application No. PCT/CN2017/105012, filed on Sep. 30, 2017.

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/1819* (2013.01); *H04L 5/0048* (2013.01);
(Continued)

(58) Field of Classification Search
CPC .......................... H04W 72/042; H04L 5/0048
See application file for complete search history.

(56) References Cited

U.S. PATENT DOCUMENTS

2012/0020323 A1 1/2012 Noh
2013/0265955 A1 10/2013 Kim et al.
(Continued)

FOREIGN PATENT DOCUMENTS

CN 101989970 A 3/2011
CN 102055689 A 5/2011
(Continued)

OTHER PUBLICATIONS

International Search Report in the international application No. PCT/CN2017/105012, dated Apr. 28, 2018.
(Continued)

*Primary Examiner* — Harry H Kim
(74) *Attorney, Agent, or Firm* — Perkins Coie LLP (57) ABSTRACT

A method for indicating a channel resource, a terminal device and a network device are provided. The method includes that: at least two resource sets are determined, the at least two resource sets at least including a first resource set and a second resource set and different resource sets corresponding to different Demodulation Reference Signal (DMRS) mapping types or corresponding scheduling types respectively; and a first resource from one resource set of the at least two resource sets is determined. Respective resource scheduling flexibility of each scheduling type may be improved, higher resource utilization rate and transmission performance for channel transmission are achieved, and a higher signaling overhead is avoided.

16 Claims, 4 Drawing Sheets

(51) Int. Cl.
  *H04W 72/02* (2009.01)
  *H04W 80/02* (2009.01)
  *H04L 1/18* (2006.01)
  *H04L 5/00* (2006.01)
  *H04L 5/10* (2006.01)
  *H04L 25/02* (2006.01)

(52) U.S. Cl.
  CPC .......... *H04L 5/0051* (2013.01); *H04L 5/0055* (2013.01); *H04L 5/10* (2013.01); *H04W 72/1273* (2013.01); *H04W 80/02* (2013.01)

(56) References Cited

U.S. PATENT DOCUMENTS

| | | | |
|---|---|---|---|
| 2014/0036810 | A1 | 2/2014 | Harrison et al. |
| 2015/0063236 | A1 | 3/2015 | Seo et al. |
| 2015/0215908 | A1 | 7/2015 | Seo et al. |
| 2015/0358124 | A1 | 12/2015 | Suzuki et al. |
| 2016/0006548 | A1 | 1/2016 | Yang et al. |
| 2017/0245251 | A1 | 8/2017 | Kim et al. |
| 2018/0227156 | A1 | 8/2018 | Papasakellariou |
| 2018/0234277 | A1* | 8/2018 | Akkarakaran ........ H04L 5/0035 |
| 2018/0279305 | A1 | 9/2018 | Bagheri et al. |
| 2019/0082427 | A1 | 3/2019 | Kim et al. |
| 2019/0268095 | A1* | 8/2019 | Yeo ........................ H04W 80/08 |
| 2019/0268889 | A1 | 8/2019 | Kim et al. |
| 2019/0342944 | A1* | 11/2019 | Chatterjee ............. H04L 5/0091 |
| 2019/0393992 | A1* | 12/2019 | Xiong ................... H04L 5/0055 |
| 2020/0068566 | A1* | 2/2020 | Gao ......................... H04L 5/00 |
| 2020/0077370 | A1* | 3/2020 | Qu ........................ H04L 5/0007 |
| 2020/0229220 | A1* | 7/2020 | Seo ....................... H04L 5/0092 |

FOREIGN PATENT DOCUMENTS

| | | |
|---|---|---|
| CN | 102404854 A | 4/2012 |
| CN | 102869096 A | 1/2013 |
| CN | 103166880 A | 6/2013 |
| CN | 104081872 A | 10/2014 |
| CN | 106487487 A | 3/2017 |
| CN | 106559363 A | 4/2017 |
| CN | 111052666 A | 4/2020 |
| EP | 3606240 A1 | 2/2020 |
| RU | 2598533 C1 | 9/2016 |
| WO | 2011153859 A1 | 12/2011 |
| WO | 2013134272 A1 | 9/2013 |
| WO | 2015137770 A1 | 9/2015 |
| WO | 2016163623 A1 | 10/2016 |
| WO | 2019050306 A1 | 3/2019 |

OTHER PUBLICATIONS

Samsung. On SS Block/PDSCH/DMRS Multiplexing. 3GPP TSG RAN WG1 Meeting #90 R1-1714586. Aug. 25, 2014 (Aug. 25, 2014), entire document.

3rd Generation Partnership Project; Technical Specification Group Services and System Aspects; Procedures for the 5G System; Stage 2 (Release 15), 3GPP TS 23.502 V15.0.0 (Dec. 2017).

3rd Generation Partnership Project; Technical Specification Group Radio Access Network; NR; Packet Data Convergence Protocol (PDCP) specification (Release 15), 3GPP TS 38.323 V15.1.0 (Mar. 2018).

Huawei et al: "Design of DMRS for DL/UL data transmission", 3GPP Draft; R1-1715472, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18-21, 2017, Sep. 17, 2017 (Sep. 17, 2017), XP051338940, Retrieved from the Internet: URL: http://www.3gpp. org/ftp/ Meetings 3GPP SYNC/ RAN1/Docs/ [ retrieved on Sep. 17, 2017] Sect.s 1, 2, 3.3, 4.

Qualcomm: "Remaining issues on NR DM-RS", 3GPP Draft; R1-1715082, 3rd Generation Partnership Project (3GPP), Mobile Competence Centre ; 650, Route Des Lucioles; F-06921 Sophia-Anti Polis Cedex; France, vol. RAN WG1, No. Prague, Czech Republic; Aug. 21-25, 2017, Aug. 26, 2017 (Aug. 26, 2017), XP051328568, Retrieved from the Internet: URL: http://www.3gpp. org/ftp/tsg ran/WG1 RL1/TSGR1 90/Docs/[ retrieved on Aug. 26, 2017] Sect.s 1.2, 1.3.

MCC Support; Final Report of 3GPP TSG RAN WG1 #AH_NR2 v1.0.0 (Qingdao, China, Jun. 27-30, 2017); 3GPP TSG RAN WG1 Meeting #90, R1-1712032, Prague, Czech Rep, Aug. 21-25, 2017.

MCC Support; Final Report of 3GPP TSG RAN WG1 #AH_NR3 v1.0.0 (Nagoya, Japan, Sep. 18-21, 2017); 3GPP TSG RAN WG1 Meeting #90bis, R1-1716942, Prague, Czech Rep, Oct. 9-13, 2017.

LG Electronics: "Consideration on PUCCH resource allocation for NR", 3GPP Draft; R1-1715883, 3rd Generation Partnership Project (3GPP), Mobilecompetence Centre ; 650, Route Des Lucioles; F-06921 Sophia-Antipolis Cedex; France, vol. RAN WG1, No. Nagoya, Japan; Sep. 18-21, 2017, Sep. 11, 2017 (Sep. 11, 2017), XP051329289, Retrieved from the Internet: URL: http://www.3gpp. org/ftp/tsgran/WG1 RL1/TSGR1 AH/NR AH 1709/Docs/ [ retrieved on Sep. 11, 2017] the whole document.

Nokia et al: "PUCCH Resource Allocation and PUCCH Transmit Diversity", 3GPP Draft; R1-1716146 PUCCH Resource Allocation and PUCCH Transmit Diversity, 3rd Generation Partnership Project (3GPP), Mobile Competence Centre; 650, Route Des Lucioles; F-06921 Sophia-Antipolis, vol. RAN WG1, No. Nagoya, Japan; Sep. 18-21, 2017, Sep. 17, 2017 (Sep. 17, 2017), XP051339604, Retrieved from the Internet: RL: http://www.3gpp. org/ftp/Meetings 3GPP SYNC/RAN1/Docs/[ retrieved on Sep. 17, 2017] p. 1-p. 5.

Supplementary European Search Report in the European application No. 17926623.4, dated Jul. 9, 2020.

Supplementary European Search Report in the European application No. 18862675.8, dated Jul. 2, 2020.

International Search Report in the international application No. PCT/CN2018/107126, dated Nov. 28, 2018.

Written Opinion of the International Search Authority in the international application No. PCT/CN2018/107126, dated Nov. 28, 2018.

Written Opinion of the International Search Authority in the international application No. PCT/CN2017/105012, dated Apr. 28, 2018.

First Office Action of the Chinese application No. 201911326453.2, dated Nov. 3, 2020.

Huawei et al: "Multiplexing different types of RSS for DL and UL", 3GPP Draft; R1-1715470, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017 (Sep. 17, 2017), XP051338938, [retrieved on Sep. 17, 2017].

Intel Corporation: "DL and UL scheduling and HARQ feedback in NR", 3GPP Draft: R1-1716321 Intel Schedharq, 3rd Generation Partnership Project (3GPP), Mobile Competence Centre; 650. Route Des Lucioles; F-06921 Sophia-Antipolis Cedex; France vol. RAN WG1, No. Nagoya, Japan; Sep. 18, 2017-Sep. 21, 2017 Sep. 12, 2017 (Sep. 12, 2017), XP051329912; [retrieved on Sep. 12, 2017].

First Office Action of the European application No. 18862675.8, dated Jan. 25, 2021.

Notice of Allowance of the Russian application No. 2020101593, dated Dec. 17, 2020.

First Office Action of the Canadian application No. 3066665, dated Feb. 17, 2021.

First Office Action of the Chinese application No. 202010087295.6, dated May 8, 2021.

First Office Action of the U.S. Appl. No. 16/626,110, dated Apr. 13, 2021.

First Office Action of the European application No. 17926623.4, dated Mar. 18, 2021.

First Office Action of the Chilean application No. 201903696, dated Mar. 16, 2021.

* cited by examiner

CHANNEL RESOURCE INDICATION METHOD, TERMINAL DEVICE AND NETWORK DEVICE

CROSS-REFERENCE TO RELATED APPLICATION

This application claims priority to PCT Application No. PCT/CN2017/105012, filed on Sep. 30, 2017, and entitled "CHANNEL RESOURCE SET INDICATION METHOD, TERMINAL DEVICE AND NETWORK DEVICE", the disclosure of which is hereby incorporated by reference in its entirety.

BACKGROUND

In a Long Term Evolution (LTE) system, a resource for a Physical Uplink Control Channel (PUCCH) of a certain terminal may be indicated by a two-step method: one resource set including multiple candidate frequency-domain resources is configured by a base station for the terminal through Radio Resource Control (RRC) signaling; and then one frequency-domain resource is specified from the resource set by the based station through Downlink Control Information (DCI) for PUCCH transmission of the terminal. In technical discussions about 5th-Generation (5G) New Radio (NR), a resource set method may also be adopted for PUCCH resource allocation. One or more multidimensional resource sets may be configured by a base station for a terminal through RRC signaling, each resource set including multiple time-domain, frequency-domain and code-domain multidimensional PUCCH resources, and then one multidimensional resource may be specified by the base station from the resource sets through DCI for PUCCH transmission of the terminal.

At present, 5G NR supports two scheduling types: slot-based scheduling and symbol-based scheduling. However, unified configuration of one or a set of PUCCH resource sets is required, which may limit flexibility in resource scheduling for each scheduling type or a corresponding DCI format and bring a higher overhead of RRC signaling and DCI signaling.

SUMMARY

The disclosure relates to the technical field of information processing, and more particularly to a method for indicating a channel resource, a terminal device and a network device.

Embodiments of the disclosure provide a method for indicating a channel resource, a terminal device and a network device.

The embodiments of the disclosure provide a method for indicating a channel resource, which may be applied to a terminal device and include the following operations:

at least two resource sets are determined, the at least two resource sets at least including a first resource set and a second resource set and different resource sets corresponding to different Demodulation Reference Signal (DMRS) mapping types respectively;

a first resource is determined from one resource set of the at least two resource sets; and a first channel is transmitted based on the first resource.

The operation that the first channel is transmitted based on the first resource may include the following operations:

in a case that the first resource is determined based on the first resource set, the first channel is transmitted in a first DMRS mapping type corresponding to the first resource set, or Hybrid Automatic Repeat reQuest (HARQ) Acknowledgement (ACK) information for a second channel is transmitted by the first channel and the second channel is transmitted in the first DMRS mapping type; or in a case that the first resource is determined based on the second resource set, the first channel is transmitted in a second DMRS mapping type corresponding to the second resource set, or HARQ-ACK information for a second channel is transmitted by the first channel and the second channel is transmitted in the second DMRS mapping type.

The embodiments of the disclosure provide a method for indicating a channel resource, which may be applied to a network device and include the following operations:

at least two resource sets are configured for a terminal device; and the terminal device is instructed to select a first resource from one resource set of the at least two resource sets.

The at least two resource sets may at least include a first resource set and a second resource set, and different resource sets may correspond to different DMRS mapping types respectively.

The embodiments of the disclosure provide a terminal device, which may include a processing unit and a communication unit.

The processing unit may determine at least two resource sets, the at least two resource sets at least including a first resource set and a second resource set and different resource sets corresponding to different DMRS mapping types respectively, and determine a first resource from one resource set of the at least two resource sets.

The communication unit may transmit a first channel based on the first resource.

The communication unit, in a case that the first resource is determined based on the first resource set, may transmit the first channel in a first DMRS mapping type corresponding to the first resource set, or transmit, through the first channel, HARQ-ACK information for a second channel and transmit the second channel in the first DMRS mapping type, or in a case that the first resource is determined based on the second resource set, may transmit the first channel in a second DMRS mapping type corresponding to the second resource set, or transmit, through the first channel, HARQ-ACK information for a second channel and transmit the second channel in the second DMRS mapping type.

The embodiments of the disclosure provide a network device, which may include a configuration unit and an instruction unit.

The configuration unit may configure at least two resource sets for a terminal device.

The instruction unit may instruct the terminal device to select a first resource from one resource set of the at least two resource sets.

The at least two resource sets may at least include a first resource set and a second resource set, and different resource sets may correspond to different DMRS mapping types respectively.

The embodiments of the disclosure also provide a terminal device, which may include a processor and a memory configured to store a computer program capable of running in the processor.

The processor may be configured to run the computer program to execute the steps of the abovementioned method.

The embodiments of the disclosure also provide a network device, which may include a processor and a memory configured to store a computer program capable of running in the processor.

The processor may be configured to run the computer program to execute the steps of the abovementioned method.

The embodiments of the disclosure also provide a computer storage medium, which stores a computer-executable instruction, the computer-executable instruction being executed to implement the steps of the abovementioned methods.

According to the technical solutions of the embodiments of the disclosure, different resource sets may be configured for different scheduling types and DMRS mapping types, so that corresponding candidate resources may be optimized for different scheduling types and DMRS mapping types respectively, resource set selection and specific resource determination are further implemented based on network-side information (for example, information indicative of a scheduling type and DMRS mapping type, a corresponding DCI format and DCI) during scheduling of each time, and a channel is transmitted on a determined resource. Therefore, the problem of limited flexibility in resource scheduling of each scheduling type caused by "unified configuration of one or a set of PUCCH resource sets for multiple scheduling types or corresponding DCI formats" in a conventional art is solved. According to the solutions of the disclosure, the flexibility in resource scheduling of each scheduling type may be improved, a higher resource utilization rate and transmission performance for channel transmission are achieved, and a higher signaling overhead is avoided.

DETAILED DESCRIPTION

In order to make the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Embodiment 1

Figure 1:
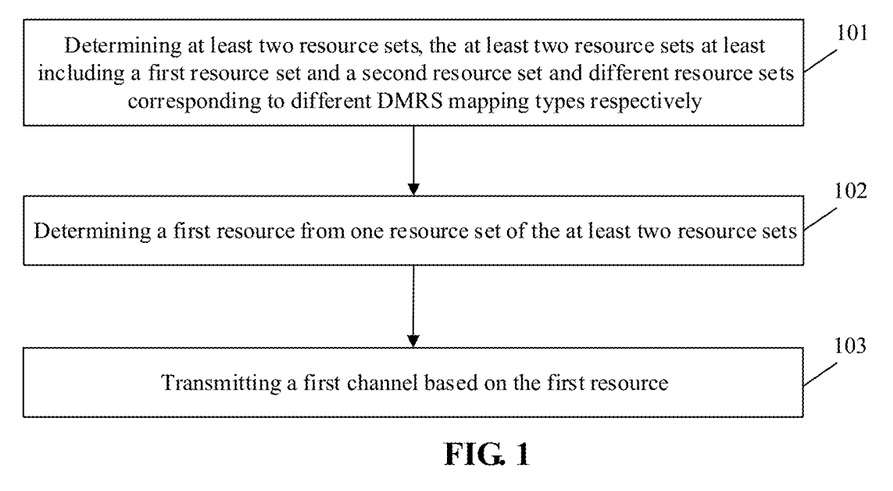
FIG. 1 is a first flowchart of a method for indicating a channel resource according to an embodiment of the disclosure.

The embodiment of the disclosure provides a method for indicating a channel resource, which may be applied to a terminal device and, as shown in FIG. 1, may include the following operations.

In the operation 101, at least two resource sets are determined, the at least two resource sets at least including a first resource set and a second resource set and different resource sets corresponding to different DMRS mapping types respectively.

In the operation 102, a first resource is determined from one resource set of the at least two resource sets.

In the operation 103, a first channel is transmitted based on the first resource.

The operation that the first channel is transmitted based on the first resource may include the following operations.

If the first resource is determined based on the first resource set, the first channel is transmitted in a first DMRS mapping type corresponding to the first resource set, or HARQ-ACK information for a second channel is transmitted by the first channel and the second channel is transmitted in the first DMRS mapping type.

If the first resource is determined based on the second resource set, the first channel is transmitted in a second DMRS mapping type corresponding to the second resource set, or the HARQ-ACK information for the second channel is transmitted by the first channel and the second channel is transmitted in the second DMRS mapping type.

Here, the terminal device may be a device capable of accessing a communication network, such as a mobile phone and a tablet computer.

In the at least two resource sets for the terminal device, each resource set may include at least one of a time-domain resource, a frequency-domain resource and a code-domain resource.

In addition, it is to be understood that the at least one of a time-domain resource, a frequency-domain resource and a code-domain resource in different resource sets is/are at least partially different; or the at least one of a time-domain resource, a frequency-domain resource and a code-domain resource in different resource sets is/are completely different.

The terminal may determine the at least two resource sets in the following manners.

Manner 1

The terminal device may determine a configuration of the first resource set and/or the second resource set based on preset information.

Specifically, the terminal may determine the configuration of the first resource set and/or the second resource set through predefined information.

The preset information or the predefined information may be preset on a terminal side according to information acquired by other operations.

Manner 2

The terminal device may determine configurations of the at least two resource sets based on first signaling transmitted by a network side.

Specifically, the terminal may determine the configuration of the first resource set and/or the second resource set according to the first signaling transmitted by a network device.

The first signaling is RRC signaling or System Information (SI).

Furthermore, the operation 102 that the first resource is determined from one resource set of the at least two resource sets may also include multiple types of processing.

Processing 1

The first resource may be determined by the terminal device from one resource set of the at least two resource sets according to first control information transmitted by the network side.

Figure 2:
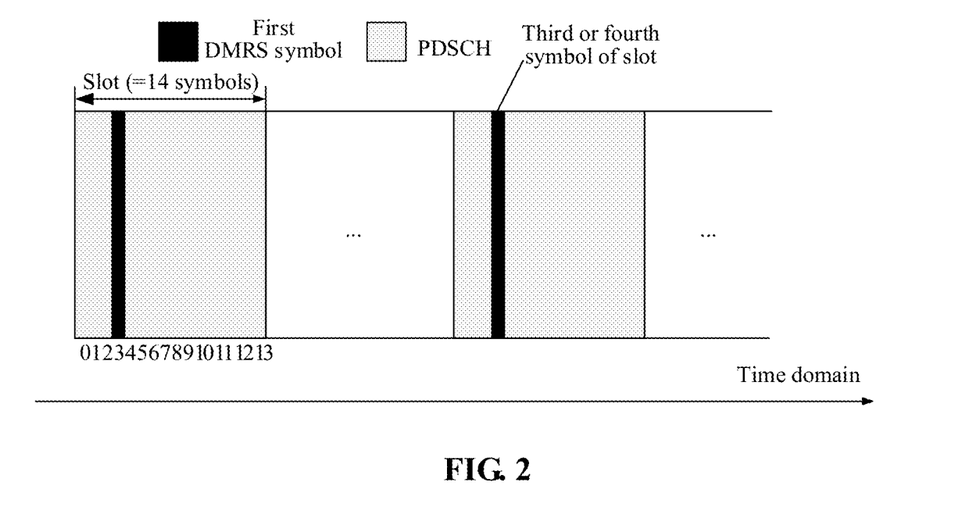
FIG. 2 is schematic diagram 1 of a mapping type according to an embodiment of the disclosure.

The first control information may include serial number information (such as symbol numbers, slot numbers, subframe numbers, or frame numbers; an example is shown in FIG. 2) of the first resource from one resource set of the at least two resource sets.

Specifically, when the at least two resource sets include the first resource set and the second resource set, the first resource may be determined by the terminal from the first resource set or the second resource set according to the first control information transmitted by the network device.

The first control information may include the serial number information of the first resource in the first resource set or the second resource set.

Processing 2

The operation that the first resource is determined from one resource set of the at least two resource sets may include the following operation.

The terminal device determines the first resource from one resource set of the at least two resource sets according to a format of the first control information or according to information indicative of a DMRS mapping type transmitted by the network side.

The format of the first control information may be a DCI format.

That is, the terminal may determine whether the first resource is determined based on the first resource set or determined based on the second resource set according to the format (for example, the DCI format) of the first control information or the information indicative of a DMRS mapping type transmitted by the network device.

In both the two processing manners, the first control information may be DCI and/or a Media Access Control (MAC) Control Element (CE).

When the first channel is transmitted in the first DMRS mapping type corresponding to the first resource set, or the HARQ-ACK information for the second channel is transmitted by the first channel and the second channel is transmitted in the first DMRS mapping type, the method further may include the following operation.

A position of at least one DMRS symbol is determined according to a starting symbol of a slot where the channel is transmitted. Or, a time-domain resource is indicated by taking a slot and/or symbol as a unit by the first channel or second channel transmitted in the first DMRS mapping type.

The position of the at least one DMRS symbol may be a third time-domain symbol or fourth time-domain symbol of the slot.

When the first channel is transmitted in the second DMRS mapping type corresponding to the second resource set, or the HARQ-ACK information for the second channel is transmitted by the first channel and the second channel is transmitted in the second DMRS mapping type, the method further may include the following operation.

The position of the at least one DMRS symbol in the first channel or second channel transmitted in the second DMRS mapping type is determined according to a starting symbol of a group of symbols.

Specifically, the position of the at least one DMRS symbol in the channel transmitted in the second DMRS mapping type may be determined according to the starting symbol of the group of symbols. The group of symbols are symbols for transmitting the data channel and a DMRS thereof. The at least one DMRS symbol may be one of:
a first symbol in the group of symbols;
one symbol in a central range of the group of symbols;
an odd symbol in the group of symbols; and
an even symbol in the group of symbols.

Being in the central range may refer to being in the middle of all the symbols. For example, if the total number of the symbols is an even number N, it may be a symbol N/2 or N/2+1, and whether it is specifically the symbol N/2 or N/2+1 depends on whether an odd symbol or an even symbol is selected.

Or, the time-domain resource is indicated by taking a symbol as a unit.

The time-domain resource is indicated by the channel transmitted in the second DMRS mapping type by taking a symbol as a unit.

From the above, with adoption of the solution, different resource sets may be configured for different scheduling types and DMRS mapping types, so that corresponding candidate resources may be optimized for different scheduling types and DMRS mapping types respectively, resource set selection and specific resource determination may be further implemented based on network-side information (for example, indication information about a scheduling type and a DMRS mapping type, and a corresponding DCI format and DCI or the like) during scheduling of each time, and a channel is transmitted on a determined resource, thereby avoiding limited resource scheduling flexibility of each scheduling type caused by "uniformly configuring one or a set of PUCCH resource sets for multiple scheduling types or corresponding DCI formats" in the conventional art. According to the solutions of the disclosure, the flexibility in respective resource scheduling of each scheduling type can be improved, higher resource utilization rate and transmission performance for channel transmission can be achieved, and a higher signaling overhead can be avoided.

In addition, whether the first resource is determined based on the first resource set or determined based on the second resource set may be determined according to existing network-side information (for example, a DCI format or indication information about a DMRS mapping type or scheduling type) without any additional signaling instruction, so that the overhead of signaling transmission can be further reduced.

Embodiment 2

In the embodiment, Physical Downlink Shared Channel (PDSCH) resource sets are configured for two DMRS mapping types respectively, specifically as follows.

Figure 3:
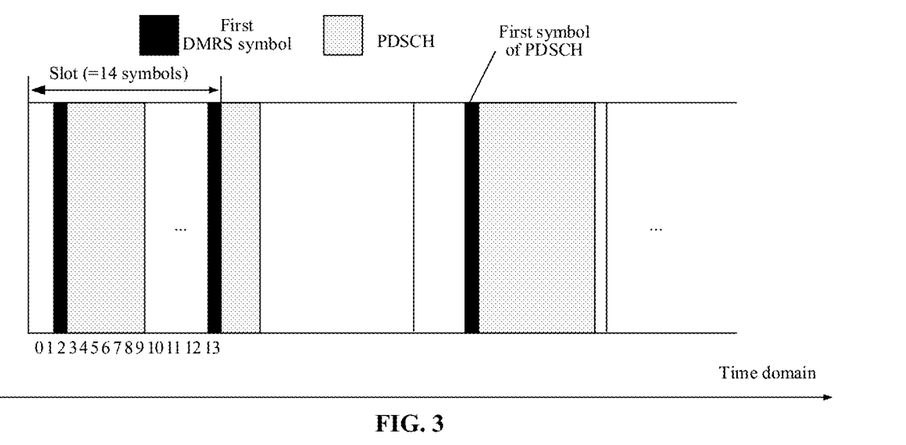
FIG. 3 is schematic diagram 2 of a mapping type according to an embodiment of the disclosure.

The two PDSCH DMRS mapping types are a DMRS mapping type A (as shown in FIG. 2) and a DMRS mapping type B (as shown in FIG. 3) respectively.

In a PDSCH adopting the DMRS mapping type A, a position of a DMRS symbol is determined by taking a starting symbol of a slot where the PDSCH is located as a reference position (for example, a first DMRS symbol is always a third or fourth symbol of the slot), and the DMRS mapping type A is mainly configured for slot-based scheduling, namely scheduling taking a slot as a unit. In a PDSCH adopting the DMRS mapping type B, a position of a DMRS symbol is determined by taking a first symbol in symbols occupied by the PDSCH as a reference position (for example, a first DMRS symbol is always a first symbol occupied by the PDSCH), and the DMRS mapping type B is mainly configured for non-slot-based scheduling, namely scheduling taking a symbol as a unit.

In the embodiment, the DMRS mapping type A (slot-based scheduling) and the DMRS mapping type B (non-slot-based scheduling) are configured with a PDSCH resource set respectively: a PDSCH resource set A and a PDSCH resource set B, including different resources respectively. As shown in the embodiment, the PDSCH resource set A may include resources with slots in four numbers, including resources with two kinds of starting symbols only but not including resources with different numbers of symbols; and the PDSCH resource set B may include resources with four different kinds of starting symbols, not including resources with different numbers of slots but including resources symbols of two quantities.

TABLE 1

Configuration of PDSCH Resource Set A for DMRS Mapping Type A (slot-based scheduling)

| Resource number | Slot number | Starting symbol position | Frequency-domain resource position |
| --- | --- | --- | --- |
| 00 | 1 | Symbol 0 | Frequency-domain position 1 |
| 01 | 1 | Symbol 3 | Frequency-domain position 1 |
| 02 | 1 | Symbol 0 | Frequency-domain position 2 |
| 03 | 1 | Symbol 3 | Frequency-domain position 2 |
| 04 | 2 | Symbol 0 | Frequency-domain position 1 |
| 05 | 2 | Symbol 3 | Frequency-domain position 1 |
| 06 | 2 | Symbol 0 | Frequency-domain position 2 |
| 07 | 2 | Symbol 3 | Frequency-domain position 2 |
| 08 | 4 | Symbol 0 | Frequency-domain position 1 |
| 09 | 4 | Symbol 3 | Frequency-domain position 1 |
| 10 | 4 | Symbol 0 | Frequency-domain position 2 |
| 11 | 4 | Symbol 3 | Frequency-domain position 2 |
| 12 | 8 | Symbol 0 | Frequency-domain position 1 |
| 13 | 8 | Symbol 3 | Frequency-domain position 1 |
| 14 | 8 | Symbol 0 | Frequency-domain position 2 |
| 15 | 8 | Symbol 3 | Frequency-domain position 2 |

TABLE 2

Configuration of PDSCH Resource Set B for DMRS Mapping Type B (non-slot-based scheduling)

| Resource number | Starting symbol position | Symbol number | Frequency-domain resource position |
| --- | --- | --- | --- |
| 00 | Symbol 0 | 1 symbol | Frequency-domain position 1 |
| 01 | Symbol 0 | 2 symbols | Frequency-domain position 1 |
| 02 | Symbol 0 | 1 symbol | Frequency-domain position 2 |
| 03 | Symbol 0 | 2 symbols | Frequency-domain position 2 |

TABLE 2-continued

Configuration of PDSCH Resource Set B for DMRS Mapping Type B (non-slot-based scheduling)

| Resource number | Starting symbol position | Symbol number | Frequency-domain resource position |
| --- | --- | --- | --- |
| 04 | Symbol 3 | 1 symbol | Frequency-domain position 1 |
| 05 | Symbol 3 | 2 symbols | Frequency-domain position 1 |
| 06 | Symbol 3 | 1 symbol | Frequency-domain position 2 |
| 07 | Symbol 3 | 2 symbols | Frequency-domain position 2 |
| 08 | Symbol 6 | 1 symbol | Frequency-domain position 1 |
| 09 | Symbol 6 | 2 symbols | Frequency-domain position 1 |
| 10 | Symbol 6 | 1 symbol | Frequency-domain position 2 |
| 11 | Symbol 6 | 2 symbols | Frequency-domain position 2 |
| 12 | Symbol 9 | 1 symbol | Frequency-domain position 1 |
| 13 | Symbol 9 | 2 symbols | Frequency-domain position 1 |
| 14 | Symbol 9 | 1 symbol | Frequency-domain position 2 |
| 15 | Symbol 9 | 2 symbols | Frequency-domain position 2 |

With this solution, resource configurations of the PDSCH resource set A and the PDSCH resource set B may be optimized for slot-based scheduling and non-slot-based scheduling respectively. The PDSCH adopting slot-based scheduling is usually required to be transmitted by multiple continuous slots to achieve better network coverage, and is more suitable to adopt the resource set A. The PDSCH adopting non-slot-based scheduling usually requires a transmission length of 1-2 symbols to implement low-latency transmission, and is more suitable to adopt the resource set B. Compared with sharing the same resource set by the DMRS mapping type A (slot-based scheduling) and the DMRS mapping type B (non-slot-based scheduling), this manner may achieve higher scheduling flexibility and reduce the number of resources in each resource pool, thereby reducing a signaling overhead of DCI when resource numbers in the resource pools is indicated by the DCI.

Embodiment 3

In the embodiment, Physical Uplink Shared Channel (PUSCH) resource sets are configured for two scheduling types respectively.

Figure 4:
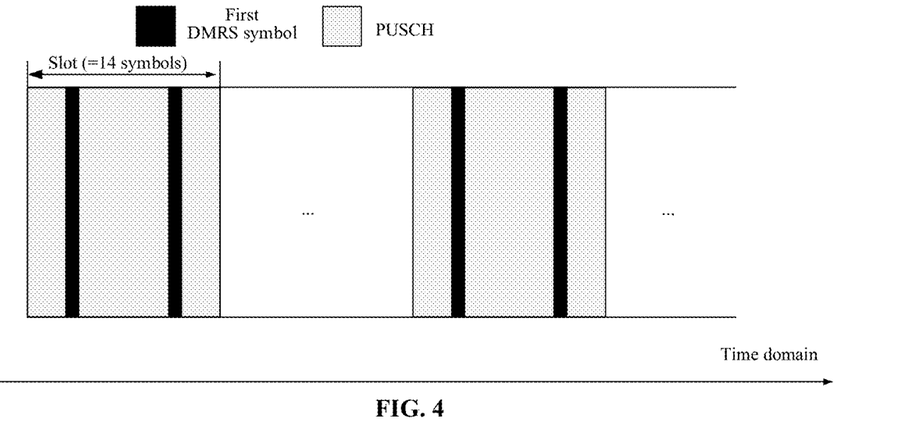
FIG. 4 is schematic diagram 3 of a mapping type according to an embodiment of the disclosure.
Figure 5:
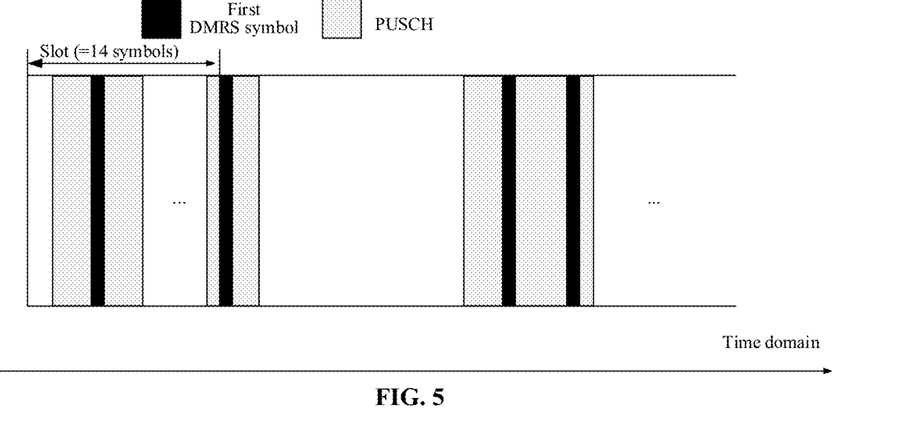
FIG. 5 is schematic diagram 4 of a mapping type according to an embodiment of the disclosure.

The two scheduling types (as shown in FIGS. 4 and 5) for a PUSCH are: slot-based scheduling, namely scheduling by taking a slot as a unit, and non-slot-based scheduling, namely scheduling by taking a symbol as a unit.

In the embodiment, two PUSCH resource sets are configured for a DMRS mapping type A (slot-based scheduling) and a DMRS mapping type B (non-slot-based scheduling) respectively: a PUSCH resource set A and a PUSCH resource set B, including different resources respectively. As shown in the embodiment, the PUSCH resource set A may include resources with slots in four numbers, only including resources with two kinds of starting symbols but not including resources with different numbers of symbols; and the PUSCH resource set B may include resources with four different kinds of starting symbols, not including resources with different numbers of slots but including resources symbols of two amounts.

TABLE 3

Configuration of PUSCH Resource Set A for
DMRS Mapping Type A (slot-based scheduling)

| Resource number | Slot number | Starting symbol position | Frequency-domain resource position |
|---|---|---|---|
| 00 | 1 | Symbol 0 | Frequency-domain position 1 |
| 01 | 1 | Symbol 3 | Frequency-domain position 1 |
| 02 | 1 | Symbol 0 | Frequency-domain position 2 |
| 03 | 1 | Symbol 3 | Frequency-domain position 2 |
| 04 | 2 | Symbol 0 | Frequency-domain position 1 |
| 05 | 2 | Symbol 3 | Frequency-domain position 1 |
| 06 | 2 | Symbol 0 | Frequency-domain position 2 |
| 07 | 2 | Symbol 3 | Frequency-domain position 2 |
| 08 | 4 | Symbol 0 | Frequency-domain position 1 |
| 09 | 4 | Symbol 3 | Frequency-domain position 1 |
| 10 | 4 | Symbol 0 | Frequency-domain position 2 |
| 11 | 4 | Symbol 3 | Frequency-domain position 2 |
| 12 | 8 | Symbol 0 | Frequency-domain position 1 |
| 13 | 8 | Symbol 3 | Frequency-domain position 1 |
| 14 | 8 | Symbol 0 | Frequency-domain position 2 |
| 15 | 8 | Symbol 3 | Frequency-domain position 2 |

TABLE 4

Configuration of PUSCH Resource Set B for DMRS
Mapping Type B (non-slot-based scheduling)

| Resource number | Starting symbol position | Symbol number | Frequency-domain resource position |
|---|---|---|---|
| 00 | Symbol 0 | 1 symbol | Frequency-domain position 1 |
| 01 | Symbol 0 | 2 symbols | Frequency-domain position 1 |
| 02 | Symbol 0 | 1 symbol | Frequency-domain position 2 |
| 03 | Symbol 0 | 2 symbols | Frequency-domain position 2 |
| 04 | Symbol 3 | 1 symbol | Frequency-domain position 1 |
| 05 | Symbol 3 | 2 symbols | Frequency-domain position 1 |
| 06 | Symbol 3 | 1 symbol | Frequency-domain position 2 |
| 07 | Symbol 3 | 2 symbols | Frequency-domain position 2 |
| 08 | Symbol 6 | 1 symbol | Frequency-domain position 1 |
| 09 | Symbol 6 | 2 symbols | Frequency-domain position 1 |
| 10 | Symbol 6 | 1 symbol | Frequency-domain position 2 |
| 11 | Symbol 6 | 2 symbols | Frequency-domain position 2 |
| 12 | Symbol 9 | 1 symbol | Frequency-domain position 1 |
| 13 | Symbol 9 | 2 symbols | Frequency-domain position 1 |
| 14 | Symbol 9 | 1 symbol | Frequency-domain position 2 |
| 15 | Symbol 9 | 2 symbols | Frequency-domain position 2 |

With this solution, resource configurations of the PUSCH resource set A and the PUSCH resource set B may be optimized for slot-based scheduling and non-slot-based scheduling respectively. The PUSCH adopting slot-based scheduling is usually required to be transmitted by multiple continuous slots to achieve better network coverage, and is more suitable to adopt the resource set A. The PUSCH adopting non-slot-based scheduling usually requires a transmission length of 1-2 symbols to implement low-latency transmission, and is more suitable to adopt the resource set B. Compared with sharing the same resource set by slot-based scheduling and non-slot-based scheduling. This manner may achieve higher scheduling flexibility and reduce the number of resources in each resource pool, thereby reducing a signaling overhead of DCI when resource numbers in the resource pools is indicated by the DCI.

Embodiment 4

In the embodiment, two resource sets are configured for PUCCHs carrying HARQ-ACKs corresponding to PDSCHs adopting two DMRS mapping types respectively.

The two PDSCH DMRS mapping types are a DMRS mapping type A (as shown in FIG. 2) and a DMRS mapping type B (as shown in FIG. 3) respectively. In the PDSCH adopting the DMRS mapping type A, a position of a DMRS symbol is determined by taking a starting symbol of a slot where the PDSCH is located as a reference position (for example, a first DMRS symbol is always a third or fourth symbol of the slot), and the DMRS mapping type A is mainly configured for slot-based scheduling, namely scheduling by taking a slot as a unit. In the PDSCH adopting the DMRS mapping type B, a position of a DMRS symbol is determined by taking a first symbol in symbols occupied by the PDSCH as a reference position (for example, a first DMRS symbol is always a first symbol occupied by the PDSCH), and the DMRS mapping type B is mainly configured for non-slot-based scheduling, namely scheduling by taking a symbol as a unit.

In the embodiment, two PUCCH resource sets are configured for the PUCCHs carrying the HARQ-ACKs corresponding to the PDSCHs adopting the DMRS mapping type A (slot-based scheduling) and the DMRS mapping type B (non-slot-based scheduling) respectively: a PUCCH resource set A and a PUCCH resource set B, including different resources respectively. As shown in the embodiment, the PUCCH resource set A may include resources with slots in four numbers, including resources with two kinds of starting symbols only but not including resources with different numbers of symbols; and the PUCCH resource set B may include resources with four different kinds of starting symbols, not including resources with different numbers of slots but including two quantities of resources symbols.

TABLE 5

Configuration of Resource Set A for PUCCH carrying
HARQ-ACK Corresponding to PDSCH Adopting DMRS
Mapping Type A (slot-based scheduling)

| Resource number | Slot number | Starting symbol position | Frequency-domain and code-domain resource combination |
|---|---|---|---|
| 00 | 1 | Symbol 0 | Frequency-domain and code-domain resource combination 1 |
| 01 | 1 | Symbol 4 | Frequency-domain and code-domain resource combination 1 |
| 02 | 1 | Symbol 0 | Frequency-domain and code-domain resource combination 2 |
| 03 | 1 | Symbol 4 | Frequency-domain and code-domain resource combination 2 |
| 04 | 2 | Symbol 0 | Frequency-domain and code-domain resource combination 1 |
| 05 | 2 | Symbol 4 | Frequency-domain and code-domain resource combination 1 |
| 06 | 2 | Symbol 0 | Frequency-domain and code-domain resource combination 2 |
| 07 | 2 | Symbol 4 | Frequency-domain and code-domain resource combination 2 |
| 08 | 4 | Symbol 0 | Frequency-domain and code-domain resource combination 1 |
| 09 | 4 | Symbol 4 | Frequency-domain and code-domain resource combination 1 |
| 10 | 4 | Symbol 0 | Frequency-domain and code-domain resource combination 2 |
| 11 | 4 | Symbol 4 | Frequency-domain and code-domain resource combination 2 |
| 12 | 8 | Symbol 0 | Frequency-domain and code-domain resource combination 1 |
| 13 | 8 | Symbol 4 | Frequency-domain and code-domain resource combination 1 |
| 14 | 8 | Symbol 0 | Frequency-domain and code-domain resource combination 2 |
| 15 | 8 | Symbol 4 | Frequency-domain and code-domain resource combination 2 |

TABLE 6

Configuration of Resource Set B for PUCCH carrying
HARQ-ACK Corresponding to PDSCH Adopting DMRS
Mapping Type B (non-slot-based scheduling)

| Resource number | Starting symbol position | Symbol number | Frequency-domain and code-domain resource combination |
|---|---|---|---|
| 00 | Symbol 3 | 1 symbol | Frequency-domain and code-domain resource combination 1 |
| 01 | Symbol 3 | 2 symbols | Frequency-domain and code-domain resource combination 1 |
| 02 | Symbol 3 | 1 symbol | Frequency-domain and code-domain resource combination 2 |
| 03 | Symbol 3 | 2 symbols | Frequency-domain and code-domain resource combination 2 |
| 04 | Symbol 6 | 1 symbol | Frequency-domain and code-domain resource combination 1 |
| 05 | Symbol 6 | 2 symbols | Frequency-domain and code-domain resource combination 1 |
| 06 | Symbol 6 | 1 symbol | Frequency-domain and code-domain resource combination 2 |
| 07 | Symbol 6 | 2 symbols | Frequency-domain and code-domain resource combination 2 |
| 08 | Symbol 9 | 1 symbol | Frequency-domain and code-domain resource combination 1 |
| 09 | Symbol 9 | 2 symbols | Frequency-domain and code-domain resource combination 1 |
| 10 | Symbol 9 | 1 symbol | Frequency-domain and code-domain resource combination 2 |
| 11 | Symbol 9 | 2 symbols | Frequency-domain and code-domain resource combination 2 |
| 12 | Symbol 12 | 1 symbol | Frequency-domain and code-domain resource combination 1 |
| 13 | Symbol 12 | 2 symbols | Frequency-domain and code-domain resource combination 1 |
| 14 | Symbol 12 | 1 symbol | Frequency-domain and code-domain resource combination 2 |
| 15 | Symbol 12 | 2 symbols | Frequency-domain and code-domain resource combination 2 |

With this solution, resource configurations of the PUCCH resource set A and the PUCCH resource set may be optimized for the PUCCH carrying the HARQ-ACK corresponding to the PDSCH adopting slot-based scheduling and the PUCCH carrying the HARQ-ACK corresponding to the PDSCH adopting non-slot-based scheduling respectively. The HARQ-ACK of the PDSCH adopting slot-based scheduling is usually required to be carried by the PUCCH in multiple continuous slots to achieve better network coverage, and is more suitable to adopt the resource set A. The HARQ-ACK of the PDSCH adopting non-slot-based scheduling is usually carried by a PUCCH of a 1-2 symbol length to implement low-latency HARQ-ACK feedback, and is more suitable to adopt the resource set B. Compared with sharing the same resource set by the two PUCCHs, this manner may achieve higher scheduling flexibility and reduce the number of resources in each resource pool, thereby reducing a signaling overhead of DCI when resource numbers in the resource pools is indicated by the DCI.

Embodiment 5

Figure 6:
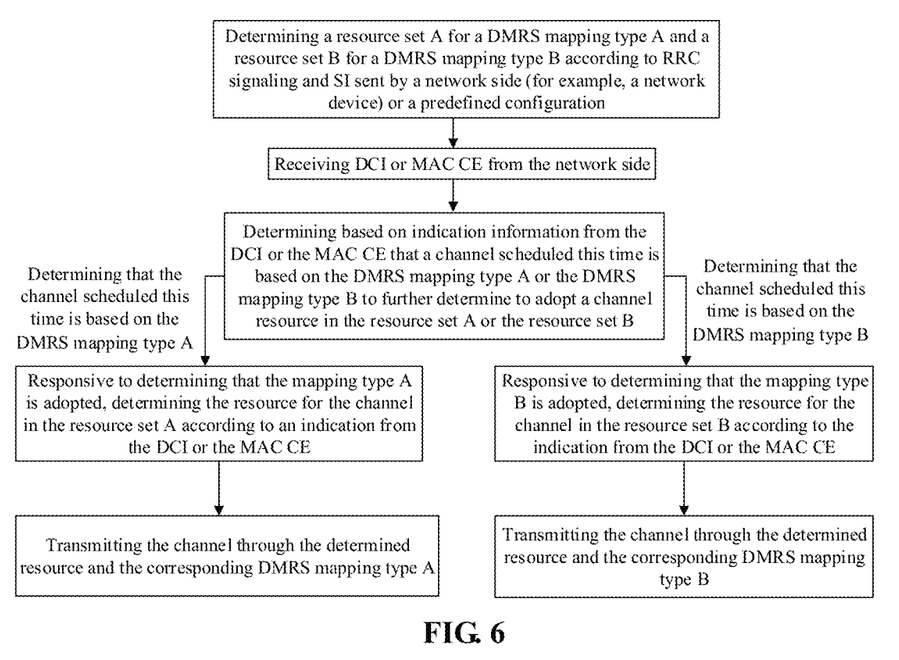
FIG. 6 is flowchart 2 of a method for indicating a channel resource according to an embodiment of the disclosure.

As shown in FIG. 6, the embodiment provides a flow of determining a resource set and a determining from the resource set a transmission resource for a channel, specifically including the following operations.

At first, a terminal device determines a resource set A for a DMRS mapping type A and a resource set B for a DMRS mapping type B according to RRC signaling and SI transmitted by a network side (for example, a network device) or a predefined configuration.

The terminal device receives DCI or MAC CE transmitted by the network side and determines based on indication information in the DCI or the MAC CE that a channel scheduled this time (i.e., the abovementioned first channel) is based on the DMRS mapping type A or the DMRS mapping type B to further determine to adopt a channel resource in the resource set A or in the resource set B.

Responsive to determining that the mapping type A is adopted, a resource for the channel is determined from the resource set A according to an indication from the DCI or the MAC CE, and the channel is transmitted by adopting the determined resource and the corresponding DMRS mapping type A.

Responsive to determining that the mapping type B is adopted, a resource for the channel is determined from the resource set B according to the indication from the DCI or the MAC CE, and the channel is transmitted using the determined resource and the corresponding DMRS mapping type B.

The disclosure discloses a method for implicitly indicating a control channel or data channel resource set through a DCI format and a scheduling type. Adoption of different channel resource sets for different DCI formats or scheduling types may be supported to improve flexibility in channel resource scheduling on the premise of not increasing a control signaling overhead.

Embodiment 6

Figure 7:
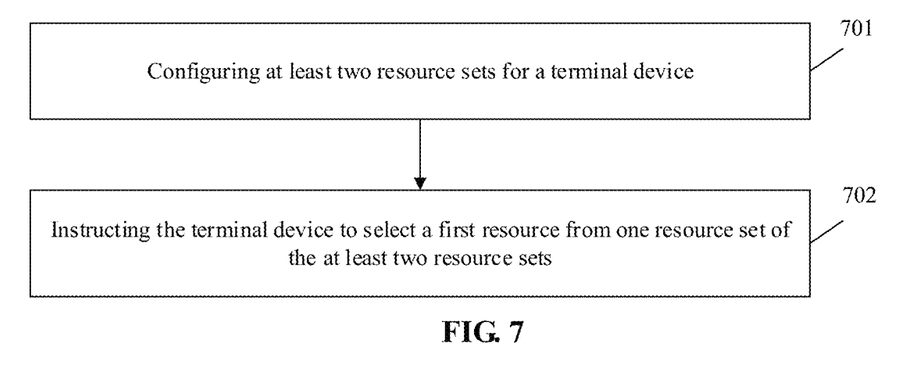
FIG. 7 is flowchart 3 of a method for indicating a channel resource according to an embodiment of the disclosure.

The embodiment of the disclosure provides a method for indicating a channel resource, which is applied to a network device and, as shown in FIG. 7, may include the following operations.

In the operation 701, at least two resource sets are configured for a terminal device.

In the operation 702, the terminal device is instructed to select a first resource from one resource set of the at least two resource sets.

The at least two resource sets may at least include a first resource set and a second resource set, and different resource sets may correspond to different DMRS mapping types respectively.

In addition, it is to be understood that at least one of a time-domain resource, a frequency-domain resource and a code-domain resource in different resource sets is/are at least partially different; or the at least one of a time-domain resource, a frequency-domain resource and a code-domain resource in different resource sets is/are completely different.

The first channel may be a PDSCH, a PUSCH or a PUCCH. A second channel may be a PDSCH.

The at least two resource sets may be determined for the terminal in the following manner.

First signaling is transmitted to the terminal device to make configurations of the at least two resource sets.

Specifically, the network device may transmit the first signaling to the terminal device to determine the configurations of the first resource set and/or the second resource set.

The network device may transmit the first signaling to the terminal to configure information of the first resource set and/or the second resource set. The configurations of the first resource set and/or the second resource set may further include serial number information of each resource therein.

The first signaling may be RRC signaling or SI.

Furthermore, the terminal device may be instructed to select the first resource from the at least two resource sets in the following manner.

First control information is transmitted to the terminal device to determine, based on the first control information, the first resource from one resource set of the at least two resource sets.

The first control information may include serial number information of the first resource in the first resource set or the second resource set.

The first control information may be transmitted in a format corresponding to the DMRS mapping type.

The first control information may include the serial number information of the first resource from one resource set of the at least two resource sets.

Specifically, when the at least two resource sets include the first resource set and the second resource set, the terminal determines the first resource in the first resource set or the second resource set according to the first control information transmitted by the network device.

The first control information may include the serial number information of the first resource in the first resource set or the second resource set.

The first control information may be DCI and/or a MAC CE.

In addition, the network side may also indicate the first resource in the following manner: the network device adopts a format (for example, a DCI format) associated with the corresponding DMRS mapping type to transmit the first control information or transmit information indicative of a DMRS mapping type to the terminal to indicate whether the terminal determines the first resource in the first resource set or the second resource set. Correspondingly, the terminal device determines the first resource from one resource set of the at least two resource sets according to a format of the first control information or according to the information indicative of a DMRS mapping type transmitted by the network side.

The format of the first control information may be a DCI format.

That is, the terminal may determine whether the first resource is determined based on the first resource set or determined based on the second resource set according to the format (for example, the DCI format) of the first control information or information indicative of the DMRS mapping type or scheduling type transmitted by the network device.

From the above, with adoption of the solution, different resource sets may be configured for different scheduling types and DMRS mapping types, so that candidate resources may be optimized for different scheduling types and DMRS mapping types respectively, resource set selection and specific resource determination are further implemented based on network-side information (for example, information of indicative a scheduling type and DMRS mapping type, and a corresponding DCI format, and DCI) during scheduling of each time, and a channel is transmitted on a determined resource. Therefore, the problem of limited flexibility in resource scheduling of each scheduling type caused by "unified configuration of one or a set of PUCCH resource sets for multiple scheduling types or corresponding DCI formats" in the conventional art is solved. According to the solutions of the disclosure, the respective flexibility in resource scheduling of each scheduling type may be improved, higher resource utilization rate and transmission performance for channel transmission are achieved, and a higher signaling overhead is avoided.

In addition, whether the first resource is determined based on the first resource set or determined based on the second resource set may be determined according to existing network-side information (for example, the DCI format or information indicative of a DMRS mapping type or scheduling type) without any additional signaling instruction, so that the overhead of signaling transmission is further reduced.

Embodiment 7

Figure 8:
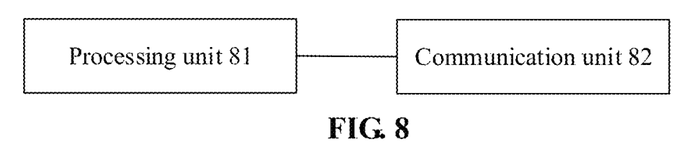
FIG. 8 is a composition structure diagram of a terminal device according to an embodiment of the disclosure.

The embodiment of the disclosure provides a terminal device, which, as shown in FIG. 8, may include a processing unit 81 and a communication unit 82.

The processing unit 81 determines at least two resource sets, the at least two resource sets at least including a first resource set and a second resource set and different resource sets corresponding to different DMRS mapping types respectively, and determines a first resource from one resource set of the at least two resource sets.

The communication unit 82 transmits a first channel based on the first resource.

In the communication unit 82, responsive to that the first resource is determined based on the first resource set, the first channel is transmitted in a first DMRS mapping type corresponding to the first resource set, or HARQ-ACK information for a second channel is transmitted through the first channel, and the second channel is transmitted in the first DMRS mapping type, and responsive to that the first resource is determined based on the second resource set, the first channel is transmitted in a second DMRS mapping type corresponding to the second resource set, or the HARQ-ACK information for the second channel is transmitted through the first channel and the second channel is transmitted in the second DMRS mapping type.

Here, the terminal device may be a device capable of accessing a communication network such as a mobile phone and a tablet computer.

In the at least two resource sets for the terminal device, each resource set may include at least one of a time-domain resource, a frequency-domain resource and a code-domain resource.

In addition, it is to be understood that the at least one of a time-domain resource, a frequency-domain resource and a code-domain resource in different resource sets is/are at least partially different; or the at least one of a time-domain resource, a frequency-domain resource and a code-domain resource in different resource sets is/are completely different.

The terminal may determine the at least two resource sets in the following manners.

Manner 1

The processing unit 81 may determines configurations of the first resource set and/or the second resource set based on preset information.

Specifically, the terminal may determine the configurations of the first resource set and/or the second resource set through predefined information.

The preset information or the predefined information may be preset on a terminal side according to information acquired by other operations.

Manner 2

The processing unit 81 may determine configurations of the at least two resource sets based on first signaling transmitted by a network side.

Specifically, the terminal device may determine the configurations of the first resource set and/or the second resource set according to the first signaling transmitted by a network device.

The first signaling may be RRC signaling or SI.

Furthermore, the operation that the first resource from one resource set of the at least two resource sets may also include multiple types of processing.

Processing 1

The processing unit 81 may determine the first resource from one resource set of the at least two resource sets according to first control information transmitted by the network side.

The first control information may include serial number information of the first resource from one resource set of the at least two resource sets.

Specifically, when the at least two resource sets include the first resource set and the second resource set, the terminal determines the first resource in the first resource set or the second resource set according to the first control information transmitted by the network device.

The first control information may include the serial number information of the first resource in the first resource set or the second resource set.

Processing 2

The processing unit 81 may determine the first resource from one resource set of the at least two resource sets according to a format of the first control information or according to information indicative of a DMRS mapping type transmitted by the network side.

The format of the first control information may be a DCI format.

That is, the terminal may determine whether the first resource is determined based on the first resource set or determined based on the second resource set according to the format (for example, the DCI format) of the first control information or the information indicative of a DMRS mapping type transmitted by the network device.

In both the two processing manners, the first control information may be DCI and/or a MAC CE.

When the first channel is transmitted in the first DMRS mapping type corresponding to the first resource set, or the HARQ-ACK information for the second channel is transmitted by the first channel and the second channel is transmitted in the first DMRS mapping type, the method further may include the following operation:

a position of at least one DMRS symbol is determined according to a starting symbol of a slot where the channel is transmitted. Or, a time-domain resource is indicated for the first channel or second channel transmitted in the first DMRS mapping type by taking a slot and/or symbol as a unit.

The position of the at least one DMRS symbol may be a third time-domain symbol or fourth time-domain symbol of the slot.

When the first channel is transmitted in the second DMRS mapping type corresponding to the second resource set, or the HARQ-ACK information for the second channel is transmitted by the first channel and the second channel is transmitted in the second DMRS mapping type, the method further may include the following operation:

a position of the at least one DMRS symbol in the first channel or second channel transmitted in the second DMRS mapping type is determined according to a starting symbol of a group of symbols.

Specifically, the position of the at least one DMRS symbol in the channel transmitted in the second DMRS mapping type is determined according to the starting symbol of the group of symbols. The group of symbols are symbols for transmitting the data channel and a DMRS thereof. The at least one DMRS symbol is one of:

a first symbol in the group of symbols;
one symbol in a central range of the group of symbols;
an odd symbol in the group of symbols; and
an even symbol in the group of symbols.

Being in the central range may refer to being in the middle of all the symbols. For example, if the total number of the symbols is an even number N, it may be a symbol N/2 or N/2+1, and whether it is the symbol N/2 or N/2+1 depends on whether an odd symbol or an even symbol is selected.

Or, the time-domain resource may be indicated by taking a symbol as a unit.

The time-domain resource is indicated for the channel transmitted in the second DMRS mapping type by taking a symbol as a unit.

From the above, with adoption of the solution, different resource sets may be configured for different scheduling types and DMRS mapping types, so that candidate resources may be optimized for different scheduling types and DMRS mapping types respectively, resource set selection and specific resource determination are further implemented based on network-side information (for example, scheduling type and DMRS mapping type indication and a corresponding DCI format and DCI) during scheduling of each time, and a channel is transmitted on a determined resource. Therefore, the problem of limited flexibility in resource scheduling of each scheduling type caused by "unified configuration of one or a set of PUCCH resource sets for multiple scheduling types or corresponding DCI formats" in the conventional art is solved. According to the solutions of the disclosure, the flexibility in resource scheduling under each scheduling type may be improved, higher resource utilization rate and transmission performance for channel transmission are achieved, and a higher signaling overhead is avoided.

In addition, whether the first resource is determined based on the first resource set or determined based on the second resource set may be determined according to existing network-side information (for example, a DCI format or information indicative of a DMRS mapping type or scheduling type) without any additional signaling instruction, so that the signaling transmission overhead is further reduced.

Embodiment 8

Figure 9:
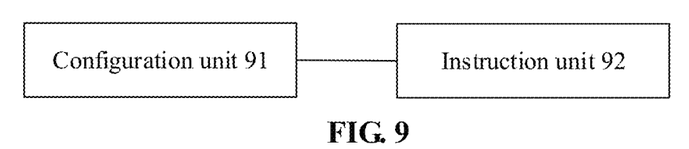
FIG. 9 is a composition structure diagram of a network device according to an embodiment of the disclosure.

The embodiment of the disclosure provides a network device, which, as shown in FIG. 9, may include a configuration unit 91 and an instruction unit 92.

The configuration unit 91 configures at least two resource sets for a terminal device.

The instruction unit 92 instructs the terminal device to select a first resource from one resource set of the at least two resource sets.

The at least two resource sets may at least include a first resource set and a second resource set, and different resource sets correspond to different DMRS mapping types respectively.

In addition, it is to be understood that at least one of a time-domain resource, a frequency-domain resource and a code-domain resource in different resource sets is/are at least partially different; or the at least one of a time-domain resource, a frequency-domain resource and a code-domain resource in different resource sets is/are completely different.

The first channel may be a PDSCH, a PUSCH or a PUCCH. A second channel may be a PDSCH.

The configuration unit 91 may transmit first signaling to the terminal device to make configurations of the at least two resource sets.

Specifically, the network device may transmit the first signaling to the terminal device to determine the configurations of the first resource set and/or the second resource set.

The network device may transmit the first signaling to the terminal to configure information of the first resource set and/or the second resource set. The configurations of the first resource set and/or the second resource set may further include serial number information of each resource therein.

The first signaling may be RRC signaling or SI.

Furthermore, the instruction unit 92 may transmit first control information to the terminal device to determine, based on the first control information, the first resource from one resource set of the at least two resource sets.

The first control information may include serial number information of the first resource in the first resource set or the second resource set.

The first control information is transmitted in a format corresponding to the DMRS mapping type.

The first control information may include the serial number information of the first resource from one resource set of the at least two resource sets.

Specifically, when the at least two resource sets include the first resource set and the second resource set, the terminal may determine the first resource in the first resource set or the second resource set according to the first control information transmitted by the network device.

The first control information may include the serial number information of the first resource in the first resource set or the second resource set.

The first control information may be DCI and/or a MAC CE.

In addition, the instruction unit 92 may also adopt a format (for example, a DCI format) associated with the corresponding DMRS mapping type to transmit the first control information or transmit information indicative of a DMRS mapping type to the terminal to indicate whether the terminal determines the first resource in the first resource set or the second resource set. Correspondingly, the terminal device determines the first resource from one resource set of the at least two resource sets according to a format of the first control information or according to the information indicative of a DMRS mapping type transmitted by the network side.

The format of the first control information may be a DCI format.

That is, the terminal may determine whether the first resource is determined based on the first resource set or determined based on the second resource set according to the format (for example, the DCI format) of the first control information or the information indicative of a DMRS mapping type transmitted by the network device.

From the above, with adoption of the solution, different resource sets may be configured for different scheduling types and DMRS mapping types, so that candidate resources may be optimized for different scheduling types and DMRS mapping types respectively, resource set selection and specific resource determination are further implemented based on network-side information (for example, information indicative of a scheduling type and DMRS mapping type, and a corresponding DCI format and DCI) during scheduling of each time, and a channel is transmitted on a determined resource. Therefore, the problem of limited flexibility in resource scheduling of each scheduling type caused by "unified configuration of one or a set of PUCCH resource sets for multiple scheduling types or corresponding DCI formats" in the conventional art is solved. According to the solutions of the disclosure, the flexibility in resource scheduling of each scheduling type may be improved, higher resource utilization rate and transmission performance for channel transmission are achieved, and a higher signaling overhead is avoided.

In addition, whether the first resource is determined based on the first resource set or determined based on the second resource set may be determined according to existing network-side information (for example, a DCI format or information indicative of a DMRS mapping type or scheduling type) without any additional signaling instruction, so that the signaling transmission overhead is further reduced.

Figure 10:
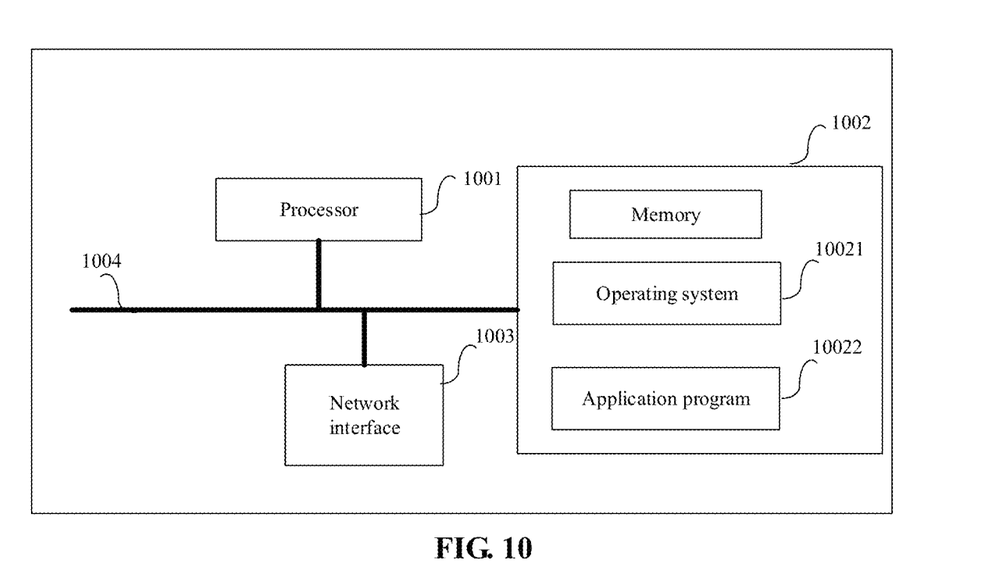
FIG. 10 is a schematic diagram of a hardware architecture according to an embodiment of the disclosure.

An embodiment of the disclosure also provides a hardware composition architecture of a terminal device or a network device, which, as shown in FIG. 10, may include at least one processor 1001, a memory 1002 and at least one network interface 1003. Each component is coupled together through a bus system 1004. It can be understood that the bus system 1004 is configured to implement connection and communication among these components. The bus system 1004 may include a data bus and further may include a power bus, a control bus and a state signal bus. However, for clear description, various buses in FIG. 10 are marked as the bus system 1004.

It can be understood that the memory 1002 in the embodiment of the disclosure may be a volatile memory or a nonvolatile memory, or may include both the volatile and nonvolatile memories.

In some corresponding modes, the memory 1002 stores the following elements, executable modules or data structures, or a subset thereof or an extended set thereof:

an operating system 10021 and an application program 10022.

The processor 1001 is configured to be capable of executing all the operations of the method in embodiment 1 or embodiment 6, and elaborations are omitted herein.

An embodiment of the disclosure provides a computer storage medium, which stores a computer-executable instruction, the computer-executable instruction being executed to implement the operations of the method in embodiment 1 or 6.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product may be stored in a storage medium, including a plurality of instructions configured to enable a computer device (which may be a personal computer, a server, a network device or the like) to execute all or part of the method in each embodiment of the disclosure. The storage medium may include: various media capable of storing program codes such as a U disk, a mobile hard disk, a Read Only Memory (ROM), a magnetic disk or an optical disk. As a consequence, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for indicating a channel resource, implemented by a terminal device and the method comprising:
   determining a first resource from one resource set of at least two resource sets according to first control information,
   wherein the at least two resource sets at least comprises a first resource set and a second resource set that are different resource sets corresponding to different Demodulation Reference Signal (DMRS) mapping types respectively, and the first control information comprises serial number information of the first resource in the one resource set of the at least two resource sets,
   wherein the serial number information includes multiple unique resource numbers respectively corresponding to the multiple resource sets; and
   transmitting a first channel based on the first resource,
   wherein transmitting the first channel based on the first resource comprises:
   when the first resource is determined based on the first resource set, transmitting the first channel in a first DMRS mapping type corresponding to the first resource set, and indicating a time-domain resource by taking a slot as a unit when the first channel is transmitted in the first DMRS mapping type; and
   when the first resource is determined based on the second resource set, transmitting the first channel in a second DMRS mapping type corresponding to the second resource set, and indicating a time-domain resource by taking a symbol as a unit when the first channel is transmitted in the second DMRS mapping type.

2. The method of claim 1, wherein each resource set comprises at least one of a time-domain resource, a frequency-domain resource and a code-domain resource.

3. The method of claim 1, wherein configurations of the at least two resource sets is determined based on preset information.

4. The method of claim 1, wherein the first control information is Downlink Control Information (DCI) or a Media Access Control (MAC) Control Element (CE).

5. The method of claim 1, wherein in a case that the first channel is transmitted in the first DMRS mapping type corresponding to the first resource set, the method further comprises:
   determining a position of at least one DMRS symbol according to a starting symbol of a slot where the channel is transmitted.

6. The method of claim 5, wherein the at least one DMRS symbol is a third time-domain symbol or fourth time-domain symbol of the slot.

7. The method of claim 1, wherein
   a position of at least one DMRS symbol on the first channel which is transmitted in the second DMRS mapping type is determined according to a starting symbol of a group of symbols, the group of symbols being symbols for transmitting the first channel.

8. The method of claim 7, wherein the at least one DMRS symbol is one of:
   a first symbol in the group of symbols;
   one symbol in a central range of the group of symbols;
   an odd symbol in the group of symbols; or
   an even symbol in the group of symbols.

9. A terminal device, comprising:
   a processor, configured to:
   determine at least two resource sets; and
   determining a first resource from one resource set of at least two resource sets according to first control information,
   wherein the at least two resource sets at least comprises a first resource set and a second resource set that are different resource sets corresponding to different Demodulation Reference Signal (DMRS) mapping types respectively, and the first control information comprises serial number information of the first resource in the one resource set of the at least two resource sets, wherein the serial number information includes multiple unique resource numbers respectively corresponding to the multiple resource sets; and a network interface, configure to transmit a first channel based on the first resource, wherein the network interface is specifically configured to:

when the first resource is determined based on the first resource set, transmit the first channel in a first DMRS mapping type corresponding to the first resource set, and indicate the time-domain resource by taking a slot as a unit when the first channel is transmitted in the first DMRS mapping type, and when the first resource is determined based on the second resource set, transmit the first channel in a second DMRS mapping type corresponding to the second resource set, and indicate the time-domain resource by taking a symbol as a unit when the first channel is transmitted in the second DMRS mapping type.

10. The terminal device of claim 9, wherein before the first resource is determined from one resource set of the at least two resource sets, the processor is configured to determine the at least two resource sets.

11. The terminal device of claim 9, wherein each resource set comprises at least one of a time-domain resource, a frequency-domain resource and a code-domain resource.

12. The terminal device of claim 9, wherein the processor is configured to determine configurations of the at least two resource sets based on preset information.

13. The terminal device of claim 9, wherein the processor is configured to, in a case that the first channel is transmitted in the first DMRS mapping type corresponding to the first resource set, determine a position of at least one DMRS symbol according to a starting symbol of a slot where the channel is transmitted.

14. The terminal device of claim 13, wherein the at least one DMRS symbol is a third time-domain symbol or fourth time-domain symbol of the slot.

15. The terminal device of claim 9, wherein the processor is configured to, determine a position of at least one DMRS symbol on the first channel transmitted in the second DMRS mapping type according to a starting symbol of a group of symbols, the group of symbols being symbols for transmitting the first channel.

16. The terminal device of claim 15, wherein the at least one DMRS symbol is one of:

a first symbol in the group of symbols;

one symbol in a central range of the group of symbols;

an odd symbol in the group of symbols; and an even symbol in the group of symbols.

* * * * *